US006570908B1

United States Patent
Jung (12)

(10) Patent No.: US 6,570,908 B1
(45) Date of Patent: May 27, 2003

(54) APPARATUS AND METHOD FOR DISTORTION COMPENSATION OF HIGH POWER AMPLIFIER IN DS-MULTICODE CDMA SYSTEM

(75) Inventor: Gill-Young Jung, Kyonggi-do (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/472,641

(22) Filed: Dec. 27, 1999

(30) Foreign Application Priority Data

Dec. 26, 1998 (KR) ........................................ 98-0059044

(51) Int. Cl.$^7$ .............................................. H04B 1/707
(52) U.S. Cl. ........................................ 375/144; 375/148
(58) Field of Search ................................ 375/141, 142, 375/143, 144, 148, 150, 152, 346, 348, 349; 370/320, 335, 342, 441

(56) References Cited

U.S. PATENT DOCUMENTS 6,215,813 B1 * 4/2001 Jones et al. ................. 375/141
6,233,271 B1 * 5/2001 Jones et al. ................. 375/142
6,301,293 B1 * 10/2001 Huang et al. ................ 375/130
6,366,607 B1 * 4/2002 Ozluturk et al. ............ 370/342

\* cited by examiner

*Primary Examiner*—Don N. Vo
(74) *Attorney, Agent, or Firm*—Dilworth & Barrese, LLP

(57) ABSTRACT

A device and method for compensating for distortion with use of a high power amplifier in a multi-code mobile communication system. In the distortion compensating device, a plurality of receivers regenerate corresponding user multi-channel signals from an input signal, an interference canceler subtracts the signals regenerated in the other receivers from the input signal, to thereby cancel the interference of the other user signals, and a distortion compensator calculates Euclidean distances between regenerated candidate information and the output of the interference canceler, using multi-channel symbols decided in the corresponding receiver and determines the candidate information with the smallest Euclidean distance.

14 Claims, 5 Drawing Sheets

APPARATUS AND METHOD FOR DISTORTION COMPENSATION OF HIGH POWER AMPLIFIER IN DS-MULTICODE CDMA SYSTEM

PRIORITY

This application claims priority to an application entitled "Device and Method for Compensating for Distortion in Multi-code Mobile Communication System" filed in the Korean Industrial Property Office on Dec. 27, 1998 and assigned Serial No. 98-59044, the contents of which are hereby incorporated by reference.

BACKGROUND OF THE INVENTION

1. Field of the Invention

The present invention relates generally to a multi-code mobile communication system, and in particular, to a device and method for compensating for a distortion occurring during multi-code transmission in a CDMA (Code Division Multiple Access) mobile communication system.

2. Description of the Related Art

The most challenging issue to the rapidly developed mobile communication industry is efficient use of limited radio frequency bands. High rate transmission using a multi-code is one of methods for efficiently accommodating future radio multi-services without increasing the spreading band width of the limited radio frequency. The multi-code transmission is a scheme of converting high rate data to several parallel low rate data, assigning an orthogonal code to each parallel code channel on which to transmit the converted parallel low rate data, and then combining the low rate data, prior to transmission.

FIG. 1 illustrates the structure of a typical transmitter in a multi-code mobile communication system. Referring to FIG. 1, four different orthogonal codes are used for data transmission. Since each subscriber uses the same transmitter in structure, a transmitter 111 for transmitting a signal to a specific subscriber will be described by way of example.

In FIG. 1, the transmitter 111 is comprised of a serial-to-parallel converter (SPC) 121, five multipliers 131 to 134 and 151, an adder 141, and an amplifier 161. The SPC 121 converts input serial user information bits $b_1(t)$ to parallel four information bits $b_{11}$ to $b_{14}$. The multiplier 131 orthogonally spreads the information bit $b_{11}$ by multiplying the information bit $b_{11}$ by a first orthogonal code $a_{11}$. The multiplier 132 orthogonally spreads the information bit $b_{12}$ by multiplying the information bit $b_{12}$ by a second orthogonal code $a_{12}$. The multiplier 133 orthogonally spreads the information bit $b_{13}$ by multiplying the information bit $b_{13}$ by a third orthogonal code $a_{13}$. The multiplier 134 orthogonally spreads the information bit $b_{14}$ by multiplying the information bit $b_{14}$ by a fourth orthogonal code $a_{14}$. The adder 141 sums the spread information bits received from the multipliers 131 to 134 bit by bit. The multiplier 151 PN-spreads the output of the adder 141 by multiplying the output of the adder 141 by a first PN code $PN_1$. The amplifier 161 amplifies the PN-spread signal received from the multiplier 151.

As described above, the typical transmitter converts a signal provided by a specific user to parallel signals, spreads each parallel signal with a different orthogonal code, sums the orthogonally spread signals, spreads the sum with a predetermined PN code, and amplifies the PN-spread signal, prior to transmission. Spreading the parallel signals with different orthogonal codes can be referred to as use of a multi-code.

Meanwhile, signals output from transmitters 111 to 11N in the above procedure are added in the air and then transmitted to a base station. From FIG. 1, it is noted that AWGN (Additive White Gaussian Noise) is added to the transmission signals of the transmitters 111 to 11N during transmission.

FIG. 2 illustrates the structure of typical receivers 211 to 21N corresponding to the transmitters 111 to 11N using the multi-code scheme. While the plurality of receivers 211 to 21N are shown in FIG. 2, the following description will be conducted on the receiver 211 of a specific user because they are the same in structure.

Referring to FIG. 2, the receiver 211 includes five multipliers 221 and 231 to 234, accumulators 251 to 254, deciders 261 to 264, and a parallel-to-serial converter (PSC) 271. The multiplier 221 PN-despreads an input signal r(t) by multiplying the input signal r(t) by its unique PN code $PN_1(t)$. The multipliers 231 to 234 multiply the PN-despread signal by a conjugate signal $\beta_1 e^{j\Phi}$ for channel compensation. Multipliers 241 to 244 multiply channel-compensated signals received from the corresponding multipliers 231 to 234 by corresponding orthogonal codes $a_{11}(t)$ to $a_{14}(t)$, for orthogonal demodulation. The mutually different orthogonal codes are the same as used in the transmitter 111. The accumulators 251 to 254 accumulate the despread signals received from the multipliers 241 to 244 in symbol units. The deciders 261 to 264 subject information bits of the outputs of the corresponding accumulators 251 to 254 to a decision. The PSC 271 converts serial information bits based on the decision results, received from the deciders 261 to 264, to a serial information bit sequence $b_1(t)$. The PSC 271 corresponds to the SPC 121 of the transmitter 111.

As shown in FIG. 2, each of the receivers 211 to 21N PN-despreads an input signal and divides the PN-despread signal into four signals as many as the codes used. Then, it multiplies each of the four signals by an orthogonal code, for orthogonal demodulation, accumulates the orthogonally demodulated signal, and subjects information bits of the accumulated signal to a decision. The decided signal is converted to a serial signal, which is information bits obtained in the receiver.

A signal passes th rough a transmitter amplifier with an increased average peak to power ratio in the multi-code transmission scheme, as compared to a single code transmission scheme. In general, a high power amplifier (HPA) corresponding to the transmitter amplifier exhibits non-linear characteristics. Therefore, if the saturation point of the HPA is set to a high level, the non-linear characteristics produces a distortion signal. To reduce the distortion, a transmitter drops the saturation point of its amplifier. The resulting decrease of efficiency of the amplifier, however, causes another problem. Furthermore, considering that power consumption is a dominant factor which determines the performance of a terminal, the above transmitter amplifier cannot be used for the terminal because it increases the power consumption.

A signal is distorted while passing through a transmitter amplifier with a high saturation point and a receiver experiences a low bit error rate (BER) performance. Therefore, the distorted signal should be compensated. In addition, since the distorted signal is likely to have errors during transmission in the air, the receiver is to be provided with an error correcting device.

SUMMARY OF THE INVENTION

It is, therefore, an object of the present invention to provide a device and method for efficiently compensating for the HPA-caused distortion of a received signal in a multi-code mobile communication system.

It is another object of the present invention to provide a device and method for outputting a received signal whose distortion is compensated for using a Euclidean distance in a multi-code mobile communication system.

It is a further object of the present invention to provide a device and method for removing another user signal acting as an interference signal in a multi-code mobile communication system.

These and other objects are achieved by providing a device for compensating for the distortion of an input signal for a receiving device in a multi-code mobile communication system. In the distortion compensating device, each of at least two receivers has a pattern generator for generating pattern signals from symbol data, and a regenerator for spreading the symbol data and pattern signals. Here, each symbol is decided by a multi-code from the input signal. An interference canceler removes a signal output from the other of the two receivers from the input signal of a specific receiver. A distortion compensator receives the symbol data and the pattern signals from the pattern generator, calculates Euclidean distances between the output of the regenerator and the output of the interference canceler, and selects one of the symbol data and pattern signals as input information based on the calculated Euclidean distances.

According to another aspect of the present invention, there is provided a method of compensating for an input signal in a receiving device having receivers for regenerating input signals received from at least two different terminals in a multi-code mobile communication system. In the distortion compensating method, pattern signals are regenerated from symbol data and the symbol data and pattern signals are spread. Here, each symbol is decided by a multi-code from the input signal. Then, a signal output from the other of the two receivers is removed from the input signal of a specific receiver, Euclidean distances are calculated between the output of the receiver and the interference-free signal, and one of the symbol data and pattern signals is selected as input information based on the calculated Euclidean distances.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

In the present invention, a receiver estimates all the states of signals possibly received from a transmitter, spreads the estimated signals with orthogonal codes and PN codes, and reproduces the spread signals through am amplifier. Then, the receiver calculates the Euclidean distances between the reproduced estimated signals and a received signal and determines one of the estimated signals to be the received signal based on the calculated Euclidean distances. Here, the orthogonal codes and PN codes are the same as used in the transmitter. Preferably, the amplifier is also the same as used in the transmitter. An estimated signal corresponding to a minimum Euclidean distance is determined to be the received signal.

The complexity of a reception algorithm in a receiver increases exponentially with the number of parallel codes. That is, the number of estimable signals increases a power of 2 ($2^n$) times in proportion to the number n of the multi-codes. Therefore, Euclidean distances should be calculated with all the estimable signals increased by $2^n$ times. Signals approximate to a transmission signal should be selected among the estimable signals to reduce the load of a transmitter and practically compensate for the distortion of a received signal. For this purpose, Euclidean distances are not calculated with all the estimable signals but signals different from a received signal by one bit are considered estimated signals and their Euclidean distances are calculated. Distortion can be compensated for simply with the signals different from the received signal by one bit since the received signal is seldom changed from a transmission signal by two or more bits due to the distortion. By reducing the number of estimable signals, the complexity of the receiver increases linearly with the number of codes. An interference cancellation technique is added to the distortion compensation technique to increase the reception accuracy of a reverse link signal.

Figure 1:
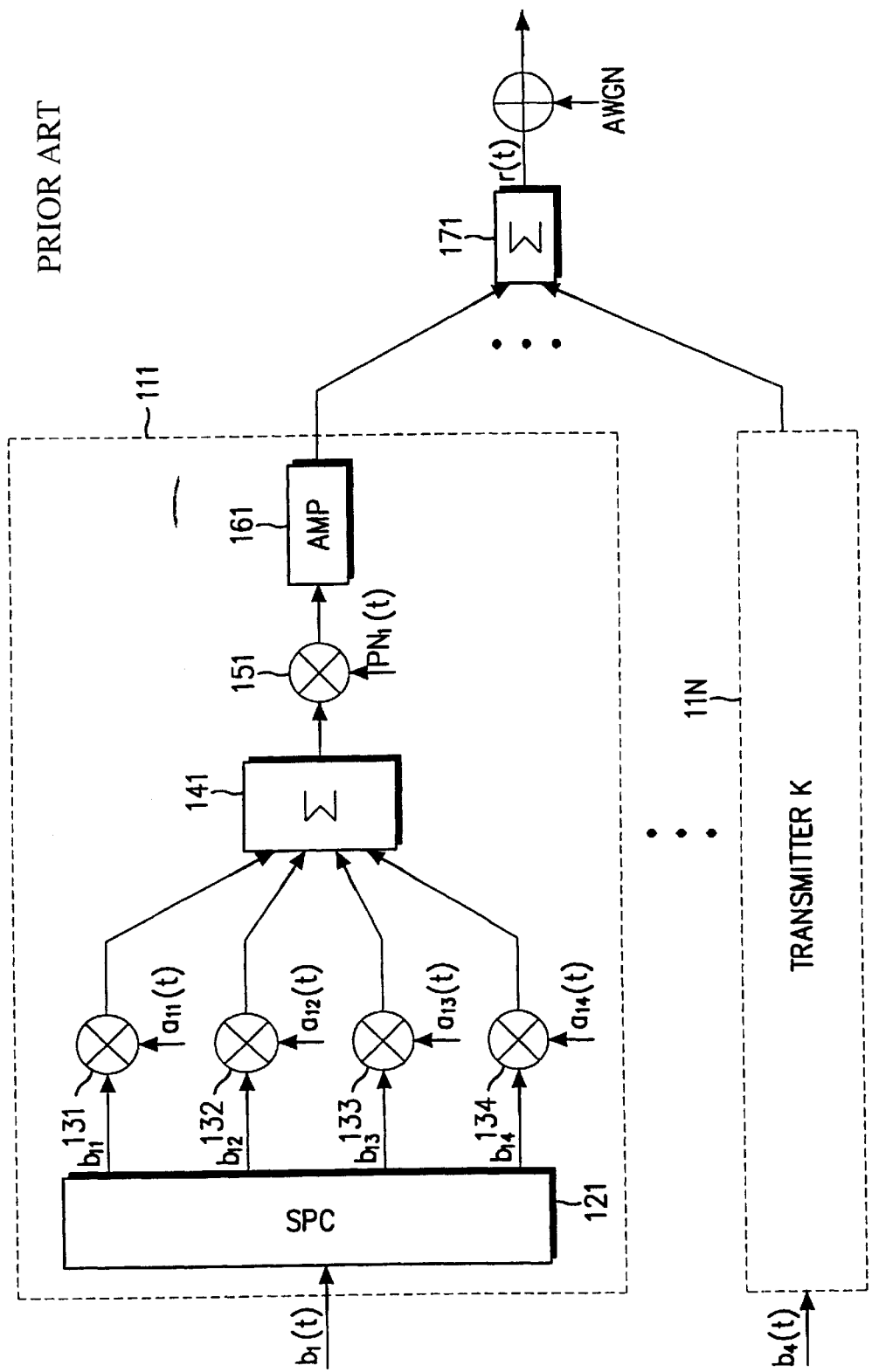
FIG. 1 illustrates the structure of a typical transmitter in a multi-code mobile communication system.
Figure 2:
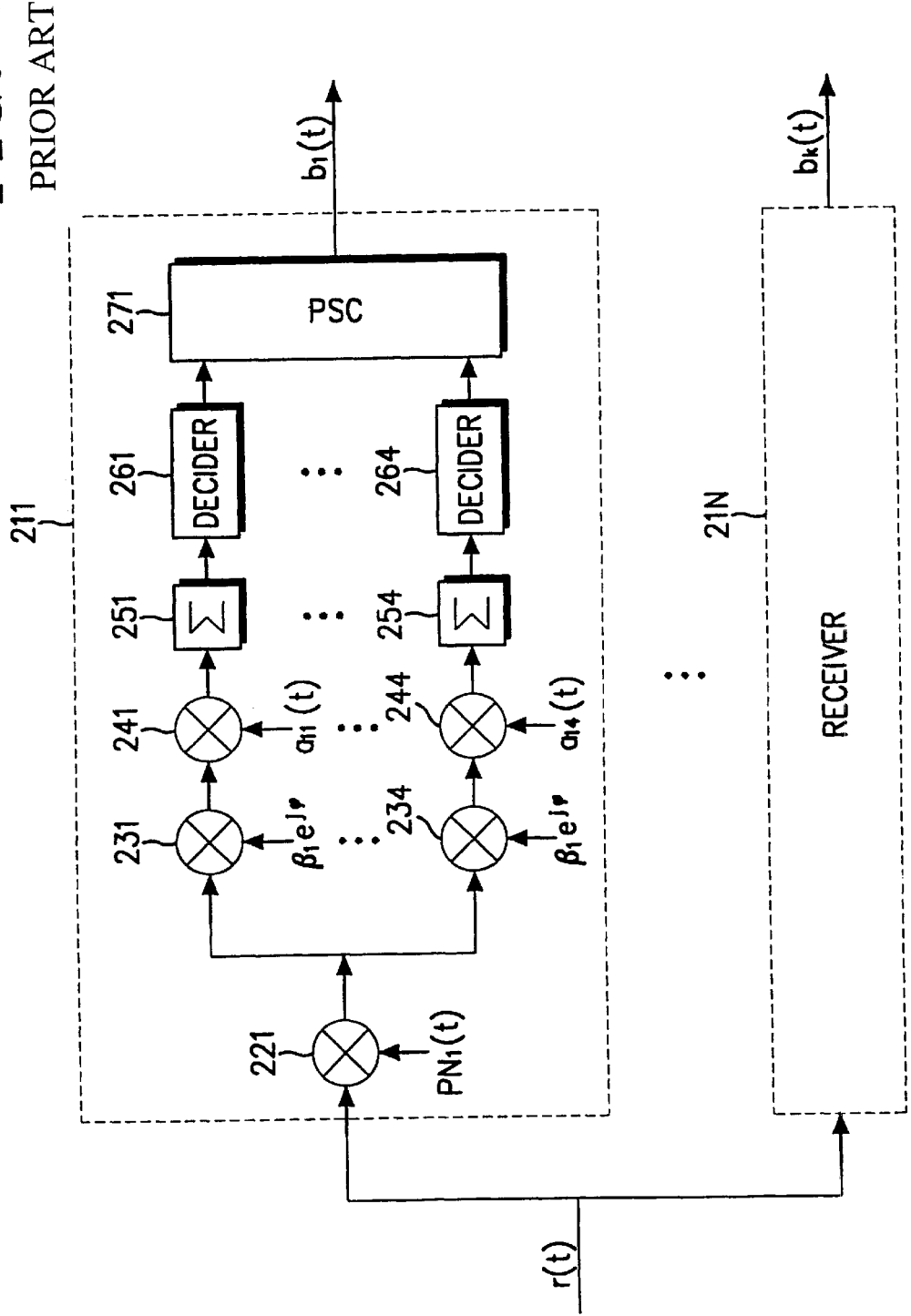
FIG. 2 illustrates the structure of a conventional receiver in the multicode mobile communication system.
Figure 3:
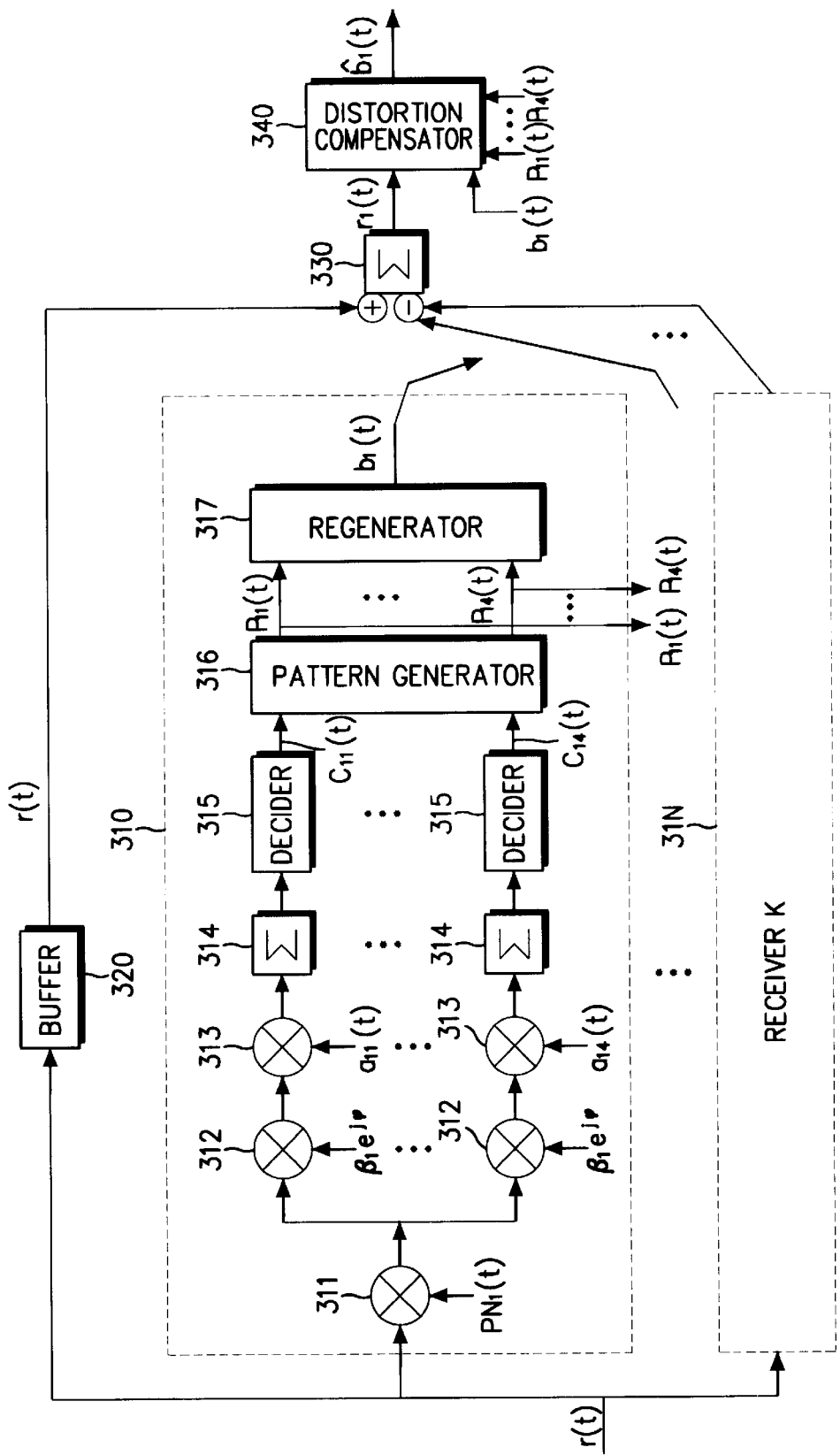
FIG. 3 illustrates the structure of a receiver in a multi-code mobile communication system according to an embodiment of the present invention.

FIG. 3 is a block diagram of a receiver in a multi-code mobile communication system according to an embodiment of the present invention. While a plurality of receivers for users are shown in FIG. 3, they are the same in structure. Thus, a description will be conducted on a receiver 310 by way of example.

Referring to FIG. 3, the receiver 310 includes five multipliers 311, 312, and 313, accumulators 314, deciders 315, a pattern generator 316, and a regenerator 317. The multiplier 311 PN-despreads an input signal r(t) by multiplying the input signal r(t) by a corresponding user code $PN_1(t)$. The input signal r(t) is the sum of signals received from different transmitters and the user code $PN_1(t)$ is the same as used in the transmitters. The multipliers 312 multiply the PN-despread signals by a conjugate signal $\beta_1 e^{j\Phi}$, for channel compensation. The multipliers 313 multiply channel-compensated signals received from the corresponding multipliers 312 by different orthogonal codes $a_{11}(t)$ to $a_{14}(t)$, for orthogonal demodulation. The orthogonal codes $a_{11}(t)$ to $a_{14}(t)$ are the same as used in the transmitters. Therefore, use of the multi-code is so called because the mutually different orthogonal codes $a_{11}(t)$ to $a_{14}(t)$ are used. The accumulators 314 accumulate the outputs of their corresponding multipliers 313 in symbol units. The deciders 315 decide symbol data, i.e., information bits $C_{11}(t)$ to $C_{14}(t)$ from the signals received from their corresponding accumulators 314. The pattern generator 316 outputs the symbol data, i.e., the information bits $C_{11}(t)$ to $C_{14}(t)$ received from the deciders 315 and pattern signals different from the symbol data by one bit. The symbol data and the pattern signals are sequentially output. Hereinafter, the output of the deciders 315 are referred to as pattern signals $P_{11}(t)$ to $P_{14}(t)$. The pattern signals $P_{11}(t)$ to $P_{14}(t)$ are the symbol data and the generated pattern signals sequentially following the symbol data. Therefore, assuming that the symbol data is four bits in total, four different pattern signals are sequentially follow the four-bit symbol data. $P_{11}(t)$ to $P_{14}(t)$ represent the bits of the symbol data and the pattern signals. For example, if $C_{11}(t)$ to $C1_4(t)$ are "1,1,1,1", the one-bit different signals, namely, the pattern signals $P_{11}(t)$ to $P_{14}(t)$ are "1,1,1,1", "1,1,1,−1", "1,1,−1,1", "1,−1,1,1", and "−1,1,1,1". The pattern generator 316 outputs a signal in symbol units. The regenerator 317 regenerates the output signals of the pattern generator 316. That is, the regenerator 317 orthogonally spreads the output signals of the pattern generator 316 with different orthogonal codes $a_{11}(t)$ to $a_{14}(t)$, sums the orthogonally spread signals, PN-spreads the sum signal with $PN_1(t)$, and then amplifies the PN-spread signal. The processing in the regenerator 317 is for regeneration of the symbol-unit output signals of the pattern generator 316 in chip units. The reason for this regeneration in chip units will be described later.

Figure 4:
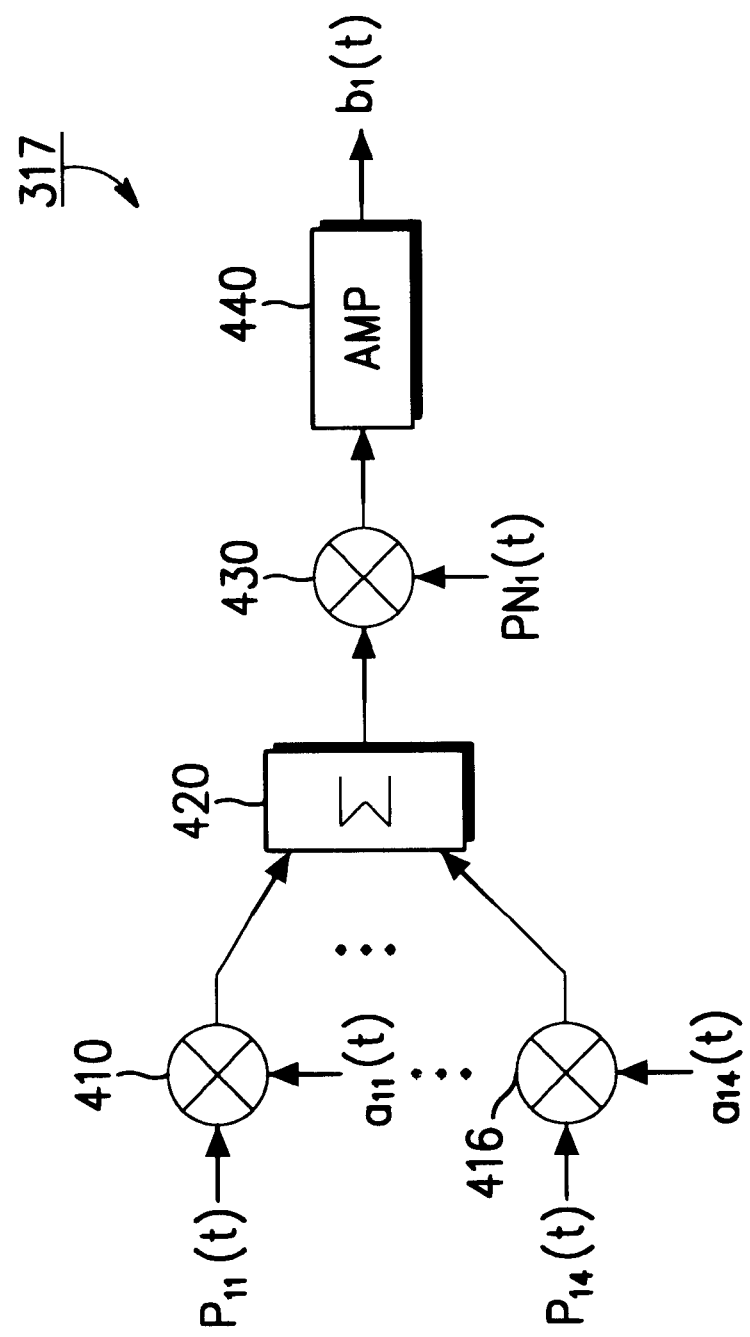
FIG. 4 is a detailed block diagram of a regenerator shown in FIG. 3.

FIG. 4 is a detailed block diagram of the regenerator 317.

Referring to FIG. 4, a buffer 320 stores the input signal r(t) and outputs the stored signal under the control of a system controller (not shown). Here, the buffer 320 is so configured as to cancel interference with a signal to be recovered. That is, the buffer 320 stores the input signal r(t) while the receivers 310 to 31N regenerate user signals, and then outputs the stored input signal r(t) under the control of the system controller at the time when the user signals $b_1(t)$ are completely regenerated. An interference canceler 330 subtracts other user signals (a signal received from the receiver 31N) from the input signal r(t) received from the buffer 320 and outputs a signal $r_1(t)$. Here, other user signals indicate signals regenerated from the other receiver 31N except for the receiver 311. The operation of the interference canceler 330 can be expressed as $$r_1(t)=r(t)-\{b_2(t)+b_3(t)+\ldots+b_N(t)\} \quad (1)$$

where $r_1(t)$ is a signal of user 1 free of other user signals (i.e., interference), r(t) is a signal before it is input to the receiver, $b_2(t)$, $b_3(t)$, and $b_N(t)$ are signals of user 2, user 3, ..., and user N regenerated in the other receiver 31N. That is, the interference canceler 330 removes other user signals received from the other receiver 31N from the non-processed input signal received from the buffer 320, for interference cancellation. This is possible by the operation the regenerator 317 as described before. That is, the regenerator 317 converts the symbol-unit signals received from the pattern generator 316 to chip-unit signals, thereby enabling the subtraction of other user signals from the input signal received from the buffer 320.

A distortion compensator 340 receives the outputs of the interference canceler 330, the regenerator 317, and the pattern generator 316, and outputs a distortion-compensated input signal using the received signals. The output signal of the regenerator 317 are in chip units. Meanwhile, the distortion compensator 340 calculates Euclidean distances from the outputs of the interference canceler 330 and the regenerator 317, and considers a pattern signal corresponding to the smallest Euclidean distance to be an input signal. As stated above, the pattern signals corresponding to the calculated Euclidean distances are provided from the pattern generator 316. Here, the distortion compensator 340 can receive the pattern signals corresponding to the Euclidean distances being calculated or receive all the pattern signals in advance, and then store in a memory table. The structure of the distortion compensator 340 is illustrated in detail in FIG. 5.

Now, there will be given a detailed description of the structure of the regenerator 317 for regenerating a symbol-unit signal into a chi-unit signal referring to FIG. 4. It should be noted that the symbol data and pattern signals output from the pattern generator 316 are referred to as pattern signals as stated before.

Multipliers 410 to 416 orthogonally spread corresponding pattern signals $P_{11}(t)$ to $P_{14}(t)$ with orthogonal codes $a_{11}(t)$ to $a_{14}(t)$. The pattern signals include the symbol data and the signals decided to be different from the symbol data by one bit in the deciders 361 to 364. An accumulator 420 accumulates the outputs of the multipliers 410 to 416 for a time period as long as symbol length. A multiplier 430 PN-spreads the output of the accumulator 420 with $PN_1(t)$. $a_{11}(t)$ to $a_{14}(t)$ and $PN_1(t)$ are the same as used in a transmitter. An amplifier 440 amplifies the output signal of the multiplier 430 at a predetermined amplification rate, to thereby regenerate the same signal as transmitted from the transmitter.

Figure 5:
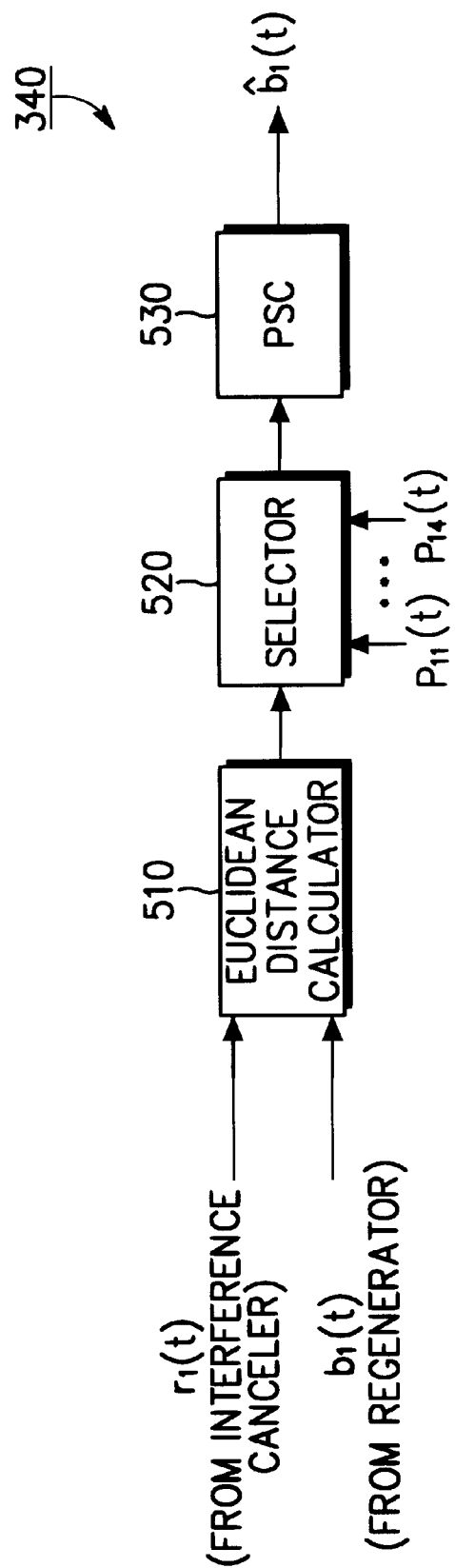
FIG. 5 is a detailed block diagram of a distortion compensator shown in FIG. 3.

Then, the structure of the distortion compensator 340 for compensating for the distortion of an input signal will described in detail with reference to FIG. 5.

A Euclidean distance calculator 510 calculates a Euclidean distance between the signal $r_1(t)$ received from the interference canceler 330 and the signal received from the regenerator 317, by $$d=\Sigma[r_1(t)-r_{candidate}(t)]^2 \quad (2)$$

where $r_1(t)$ is a chip-unit signal received from the interference canceler 330 and $r_{candidate}(t)$ is a chip-unit signal $b_1(t)$ regenerated from a signal obtained by the pattern generator 316.

A selector 520 compares Euclidean distances received from the Euclidean distance calculator 510 and selects a pattern signal corresponding to the smallest Euclidean distance. Pattern signals are provided from the pattern generator 316 and the selector 520 is so configured as to select of the pattern signal corresponding to the smallest Euclidean distance among the pattern signals. A PSC 530 converts the output of the selector 520 to a serial signal and distortion-compensated input information $b_1(t)$.

The operation of the receiver will be described in detail according to the embodiment of the present invention.

As described above, upon input of the signal r(t), each receiver PN-despreads the input signal r(t) with a spreading code PN(t), channel-compensates the PN-despread signal with $\beta_1 e^{j\Phi}$, and determines input information in advance using an orthogonal code a(t) for a parallel code channel. The receiver regenerates a signal transmitted from a transmitter using the predetermined information. Here, the predetermined information is symbols decided in the deciders 315. Meanwhile, the pattern generator 316 generates one-bit different sequences, that is, pattern signals based on the predetermined information. For example, if the predetermined symbols are 1, 1, 1, −1, the one-bit different sequences are (1, 1, 1, 1), (1, 1, −1, −1), (1, −1, 1, −1), and (−1, 1, 1, −1). By use of orthogonal codes and user PN codes used in the transmitter for these four sequences and the predetermined symbols, the transmission signal is regenerated. Then, the regenerated signal is amplified by an amplifier, to thereby regenerate candidate information $r_{candidate}(t)$. The distortion compensator 340 calculates Euclidean distances the candidate information $r_{candidate}(t)$ and the other user interference-free signal $r_1(t)$ and selects a sequence with the smallest Euclidean distance. Hence, the complexity of the receiver increases not exponentially but linearly with the number of parallel code channels in the compensation algorithm. Therefore, the receiver can have a reduced complexity and an increased BER performance.

As described above, the present invention cancels interference with an intended input user signal by removing input signals regenerated in other receivers and compensates for an error caused by a distortion component in the interference-free input signal. Accordingly, the present invention can effectively compensate for errors possibly caused by interference with or distortion of a multi-code transmitted signal in a CDMA communication system.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A device for compensating for the distortion of an input signal for a receiving device in a multi-code mobile communication system, comprising:

at least two receivers each having a pattern generator for generating pattern signals from symbol data, each symbol being decided by a multi-code from the input signal, and a regenerator for spreading the symbol data and pattern signals;

an interference canceler for removing a signal output from the other of the two receivers from the input signal of a specific receiver; and a distortion compensator for receiving the symbol data and the pattern signals from the pattern generator, calculating Euclidean distances between the output of the regenerator and the output of the interference canceler, and selecting one of the symbol data and pattern signals as input information based on the calculated Euclidean distances.

2. The device of claim 1, wherein each of the pattern signals is different in one bit from the symbol data.

3. The device of claim 2, further comprising a buffer for temporarily storing the input signal while the receivers regenerate the input signal.

4. The device of claim 3, wherein the interference canceler is an adder for adding the complement of the output signal of the other receiver and the input signal.

5. The device of claim 1, wherein the regenerator comprises:

a plurality of multipliers for spreading the output of the pattern generator with multicodes used in a transmitter;

an adder for adding the outputs of the multipliers;

a multiplier for PN-spreading the output of the adder with a PN code used in the transmitter; and an amplifier having the same characteristics as an amplifier used in the transmitter, for amplifying the output of the multiplier at a predetermined amplification rate.

6. The device of claim 1, wherein the distortion compensator comprises:

a Euclidean distance calculator for calculating Euclidean distances between the output signals of the regenerator and the output signals of the interference canceler;

a selector for receiving the symbol data and pattern signals from the pattern generator and selecting one of the received symbol data and pattern signals as input information based on the calculated Euclidean distances; and a parallel to serial converter for converting the output of the selector to serial information.

7. The device of claim 6, wherein the distortion-compensated input information is the selected symbol data or pattern signal corresponding to the smallest Euclidean distance.

8. A method of compensating for an input signal in a receiving device having receivers for regenerating input signals received from at least two different terminals in a multi-code mobile communication system, comprising the steps of:

generating pattern signals from symbol data in each receiver, each symbol being decided by a multi-code from the input signal, and spreading the symbol data and pattern signals;

removing a signal output from the other of the two receivers from the input signal of a specific receiver to create an interference-free signal; and calculating Euclidean distances between the output of the specific receiver and the interference-free signal, and selecting one of the symbol data and pattern signals as input information based on the calculated Euclidean distances.

9. The method of claim 8, wherein each of the pattern signals is different in one bit from the symbol data.

10. The method of claim 9, further comprising the steps of temporarily storing the input signal while the receivers regenerate the input signal.

11. The method of claim 10, wherein a complement of the output signal of the other receiver, and the input signal are added in the removing step.

12. The method of claim 8, wherein the spreading step further comprises the steps of:

spreading the symbol data and pattern signals with multicodes used in a transmitter;

adding the spread signals;

PN-spreading the added signal with a PN code used in the transmitter; and amplifying the PN-spread signal with the same characteristics as an amplifier used in the transmitter.

13. The method of claim 8, wherein the selecting step further comprises the steps of:

calculating Euclidean distances between the output signal of the specific receiver and the interference-free signal;

receiving symbol data and pattern signals from the specific receiver;

selecting one of the received symbol data and pattern signals as input information based on the calculated Euclidean distances; and converting the selected input information to serial information.

14. The method of claim 13, wherein the selected symbol data or pattern signal corresponds to the smallest Euclidean distance.

* * * * *